(12) United States Patent
Ståhlberg

(10) Patent No.: US 8,898,591 B2
(45) Date of Patent: Nov. 25, 2014

(54) PROGRAM REMOVAL

(75) Inventor: Mika Ståhlberg, Espoo (FI)

(73) Assignee: F-Secure Corporation, Helsinki (FI)

( * ) Notice: Subject to any disclaimer, the term of this patent is extended or adjusted under 35 U.S.C. 154(b) by 281 days.

(21) Appl. No.: 12/798,593

(22) Filed: Apr. 6, 2010

(65) Prior Publication Data

US 2011/0246936 A1 Oct. 6, 2011

(51) Int. Cl.
*G06F 3/048* (2013.01)
*G06F 21/56* (2013.01)

(52) U.S. Cl.
CPC .................................. *G06F 21/568* (2013.01)
USPC .................................. 715/808; 715/809

(58) Field of Classification Search
CPC ............... G06F 17/30; G06F 3/0481
USPC ................................. 715/808, 809
See application file for complete search history.

(56) References Cited

U.S. PATENT DOCUMENTS

| 8,079,085 | B1* | 12/2011 | Wu et al. | 726/24 |
| 2006/0143568 | A1* | 6/2006 | Milener et al. | 715/738 |
| 2007/0300178 | A1* | 12/2007 | McArdle | 715/781 |
| 2008/0046975 | A1* | 2/2008 | Boss et al. | 726/4 |
| 2009/0287653 | A1* | 11/2009 | Bennett | 707/3 |

* cited by examiner

*Primary Examiner* — Andrea Leggett
(74) *Attorney, Agent, or Firm* — Harrington & Smith

(57) ABSTRACT

According to a first aspect of the present invention there is provided a method for implementation on a computer system in order to remove or disable a program that generates dialog boxes on a display of the computer system. The method includes accepting input from a user input device that identifies a dialog box displayed on the display of the computer system, identifying the process or process module and program components associated with the identified dialog box, and attempting to terminate or disable the identified process or process module, and remove or disable the identified program components.

9 Claims, 3 Drawing Sheets

PROGRAM REMOVAL

TECHNICAL FIELD

The present invention relates to a method of removing or disabling a program from a computer system. In particular, the present invention relates to a method of removing or disabling a program that generates dialog boxes.

BACKGROUND

Malware is short for malicious software and is used as a term to refer to any software designed to infiltrate or damage a computer system without the owner's informed consent. Malware can include computer viruses, worms, trojan horses, rootkits, adware, spyware and any other malicious and unwanted software.

Many end users make use of anti-virus software to detect and possibly remove malware. In order to detect a malware file, the anti-virus software must have some way of identifying it amongst all the other files present on a device. Typically, this requires that the anti-virus software has a database containing the "signatures" or "fingerprints" that are characteristic of individual malware program files. When the supplier of the anti-virus software identifies a new malware threat, the threat is analysed and its signature is generated. The malware is then "known" and its signature can be distributed to end users as updates to their local anti-virus software databases.

Using approaches that solely rely on signature scanning to detect malware still leaves computers vulnerable to "unknown" or "zero day" malware programs/applications that have not yet been analysed for their signature. To address this issue, in addition to scanning for malware signatures, most anti-virus applications additionally employ heuristic analysis. This approach involves the application of general rules intended to distinguish the behaviour of any malware from that of clean/legitimate programs. For example, the behaviour of all programs/applications on a PC may be monitored and if a program/application attempts to write data to an executable file, the anti-virus software can flag this as suspicious behaviour. Heuristics can be based on behaviours such as API calls, attempts to send data over the Internet, etc. However, due to the ever increasing and ever changing nature of malware, these heuristic detection methods are not sufficient to detect all unknown malware.

SUMMARY

It is an object of the present invention to enable a user to remove or disable a program that generates dialog boxes on the display of a computer system. This is achieved by allowing the user to identify, to a program removal tool, a dialog box on the display of the computer system that has been generated by a program the user wishes to remove.

According to a first aspect of the present invention there is provided a method for implementation on a computer system in order to remove or disable a program that generates dialog boxes on a display of the computer system. The method comprises accepting input from a user input device that identifies a dialog box displayed on the display of the computer system, identifying the process or process module and program components associated with the identified dialog box, and attempting to terminate or disable the identified process or process module, and remove or disable the identified program components.

Embodiments of the invention provide that unwanted programs that generate dialog boxes for display on a computer system, but that might not otherwise be identifiable, can be identified and removed.

The program removal may be implemented by a program removal application that is initiated prior to the identification of a dialog box displayed on the display. Alternatively, the program removal may be implemented by a program removal application that is initiated by the identification of a dialog box displayed on the display.

The input from the user input device may comprise a point-and-click input from a user pointing device that has been used to position a pointer over the dialog box on the display. The point-and-click input may comprise an input from activation of a button on the user pointing device together with the coordinates of the pointer on the display.

The program components may comprise any of:
one or more program files;
one or more folders for containing the program files;
one or more data an configuration files belonging to the program files; and
one or more registry keys and values.

The step of identifying the process or process module and program components associated with the identified dialog box may further comprise identifying the process or process module that generated the dialog box, identifying the program file that generated the dialog box, and identifying any other files, registry keys and values associated with program file.

The step of attempting to remove the identified program components may further comprise attempting to delete any identified program file, and attempting to delete any other files, registry keys and values identified as associated with program file.

According to a second aspect of the present invention there is provided a computer program comprising computer program code means adapted to perform the following steps:
accept input from a user input device that identifies a dialog box displayed on the display of the computer system;
identify the process or process module and program components associated with the identified dialog box; and
attempt to terminate or disable the identified process or process module, and remove or disable the identified program components.

According to a third aspect of the present invention there is provided a computer program according to the above second aspect of the invention on a computer readable storage medium.

According to a fourth aspect of the present invention there is provided a computer system configured to remove or disable a program that generates dialog boxes on a display of the computer system, the computer system comprising:
a program removal unit for accepting input from a user input device, the input comprising identification of a dialog box displayed on the display of the computer system, identifying the process or process module and program components associated with the identified dialog box, and attempting to terminate or disable the identified process or process module, and remove the identified program components.

DETAILED DESCRIPTION

Figure 1:
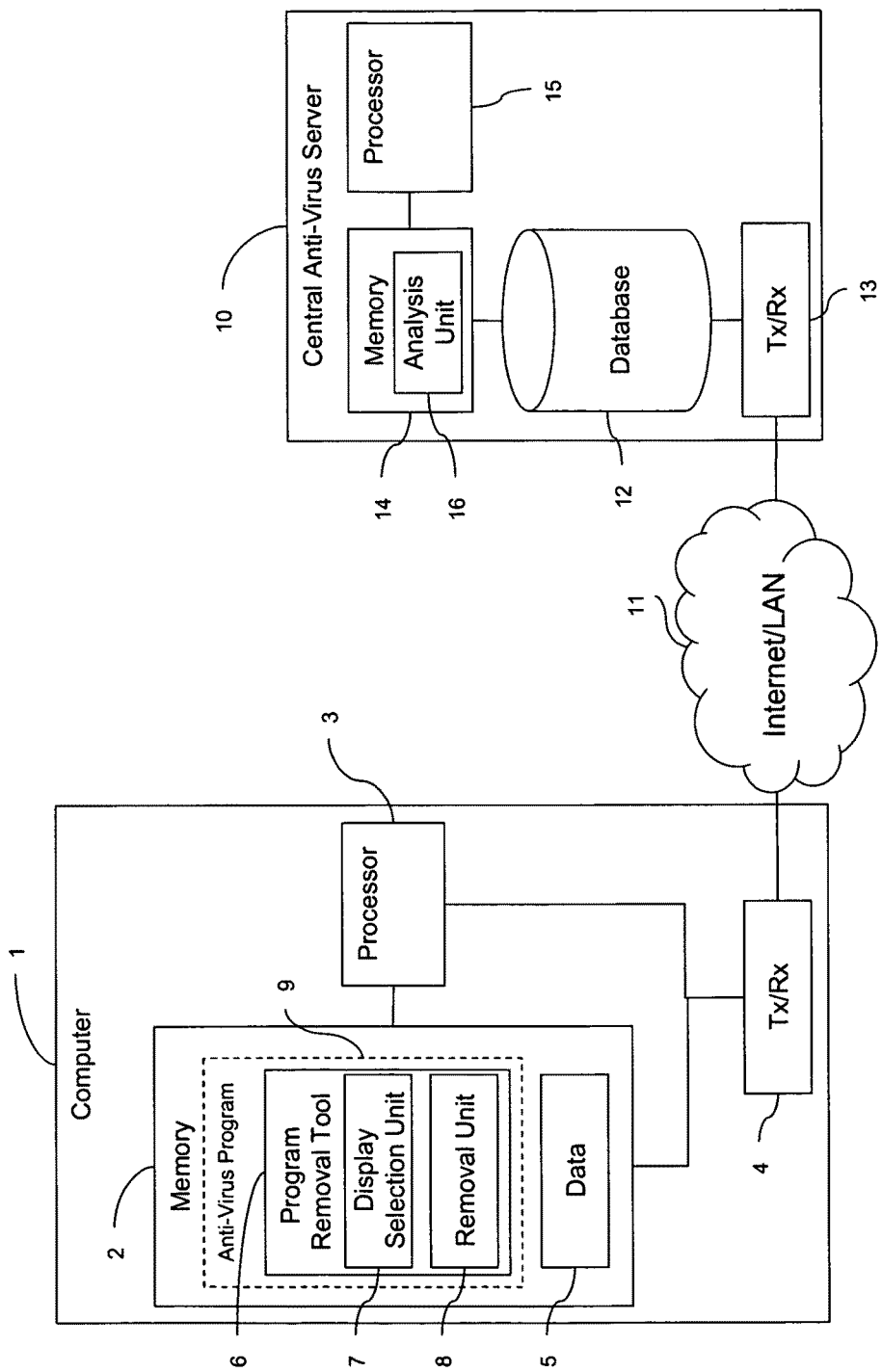
FIG. 1 illustrates schematically a computer system according to an embodiment of the present invention.

Whilst many forms of malware and other unwanted software are designed to hide any indication of their presence, some forms are specifically designed to display information to the user. For example, adware programs usually silently install themselves on a computer device in order to display advertising material to the user. However, in displaying advertising material, these adware programs may make the user aware of their presence. By way of further example, scareware, such as rogue anti-virus or anti-spyware applications, are another form of malware that usually silently install themselves on a computer system before displaying some information to the user. In many cases, scareware programs display hoax messages and warnings that a computer device is infected with some form of malware, and offers to disinfect the device provided that the user purchases a license to the software.

Typically, these forms of malware present information to a user in the form of dialog boxes. In the context of a graphical user interface, a dialog box is a special window used to display information to a user and to get a response if needed. Dialog boxes are so-called because they form a dialog between the computer and the user.

It is recognised here that this aspect of malware behaviour can be exploited in order to remove any such malware. In particular, it is proposed to provide a tool that allows a user to identify a dialog box displayed on the display or graphical user interface (GUI) of a computer system, and that then "regressively" identifies the program components associated with that dialog box in order to remove the program/application from the computer. This tool provides that malware that generates dialog boxes for display on a computer system, but that might not otherwise be identifiable, can be identified and removed.

A computer program/application is a sequence of instructions implemented by a computer system in order to perform a specific task. A computer program's source code is usually written by a programmer in a human-readable programming language, which is then compiled into one or more executable files. An executable file is a binary file that the computer's central processing unit (CPU) can run, and refers to any file containing code that is loaded, from the computer systems long-term persistent storage (i.e. non-volatile storage such as a hard disk drive), into the computer systems main memory or primary storage (i.e. random access memory, RAM), from which it is directly accessible to the CPU. For example, executable files include, but are not limited to, .EXE files, .COM files, .CMD files, .DLL files, .OCX files and any other files that the operating system of a computer may be capable of loading into the main memory as executable code. The copies of an executable file in the main memory are called the executable image or process image. A process image has segments that hold its text, data, stack etc.

This execution of a program/executable file by the CPU generates one or more processes, each of which can be comprised of components that include a process image (i.e. a copy of the executable file) and a number of modules. A process module is often referred to as a dynamic library (i.e. Microsoft® Windows® dynamic-link libraries (DLL)). A dynamic library is an executable file that acts as a shared library of functions and provides a way for a process to call a function that is not part of its executable code. The executable code for the function is located in a dynamic library that contains one or more functions that are compiled, linked, and stored separately from the processes that use them. Dynamic libraries also facilitate the sharing of data and resources, and multiple applications can simultaneously access the contents of a single copy of a dynamic library in the memory.

Some programs/applications do not have to create a process as such. Instead, they make use of an existing process as a host and have that process load a module or library. For example, a browser plug-in is a typical example of such an application that uses the browser process as a host.

Conventionally, in order to remove a program/application, a user must explicitly identify the program that they wish to remove. For example, in many cases the user must access the computer systems settings and controls (i.e. Windows® Control Panel), select the program from a list of programs installed on the computer system, and choose to uninstall the selected program. Alternatively, some programs/applications are provided with an uninstaller than can be activated by selecting an uninstall option from a program specific menu (i.e. an option provided for certain programs in the Windows® Start Menu). An uninstaller will then remove the program components. However, some programs cannot be removed using these methods and, even if a program can be removed using one of these methods, the user may not know exactly which program it is they want to remove. In particular, malware programs are usually designed to make their removal as difficult as possible, such that they do not provide an easy uninstall option, and may hide or disguise their program components to prevent them from being easily identified.

FIG. 1 illustrates schematically a computer system 1 for implementing a program removal tool that allows a user to select a dialog box on the display of the computer system, and initiate removal of the program responsible for generating the dialog box. The computer system 1 can be implemented as a combination of computer hardware and software. The computer system 1 comprises a memory 2, a processor 3 and a transceiver 4. The memory 2 stores the various programs/executable files that are implemented by the processor 3, and also provides a storage unit 5 for any required data. The programs/executable files stored in the memory 2, and implemented by the processor 3, include a program removal tool 6. The program removal tool 6 further comprises a display selection unit 7 and a removal unit 8. The program removal tool 6 can be a sub-unit of an anti-virus program 9. The transceiver 4 is used to communicate with a central anti-virus server 10 over a network 11 such as the Internet or a LAN.

The central anti-virus server 10 is typically operated by the provider of the anti-virus program 9 that is run on the computer 1. Alternatively, the central anti-virus server 10 may be that of a network administrator or supervisor, the computer 1 being part of the network for which the supervisor is responsible. The central anti-virus server 10 comprises a database 12 for storing data relating to the programs removed from computer devices, and a transceiver 13 for communication with the computer 1 over the network 11. The central anti-virus server 10 can further comprise a memory 14 and a processor 15. The memory 14 can store programs/executable files that can be implemented by the processor 15. The programs/executable files stored in the memory 14, and implemented by the processor 15, include an analysis unit 16.

Figure 2:
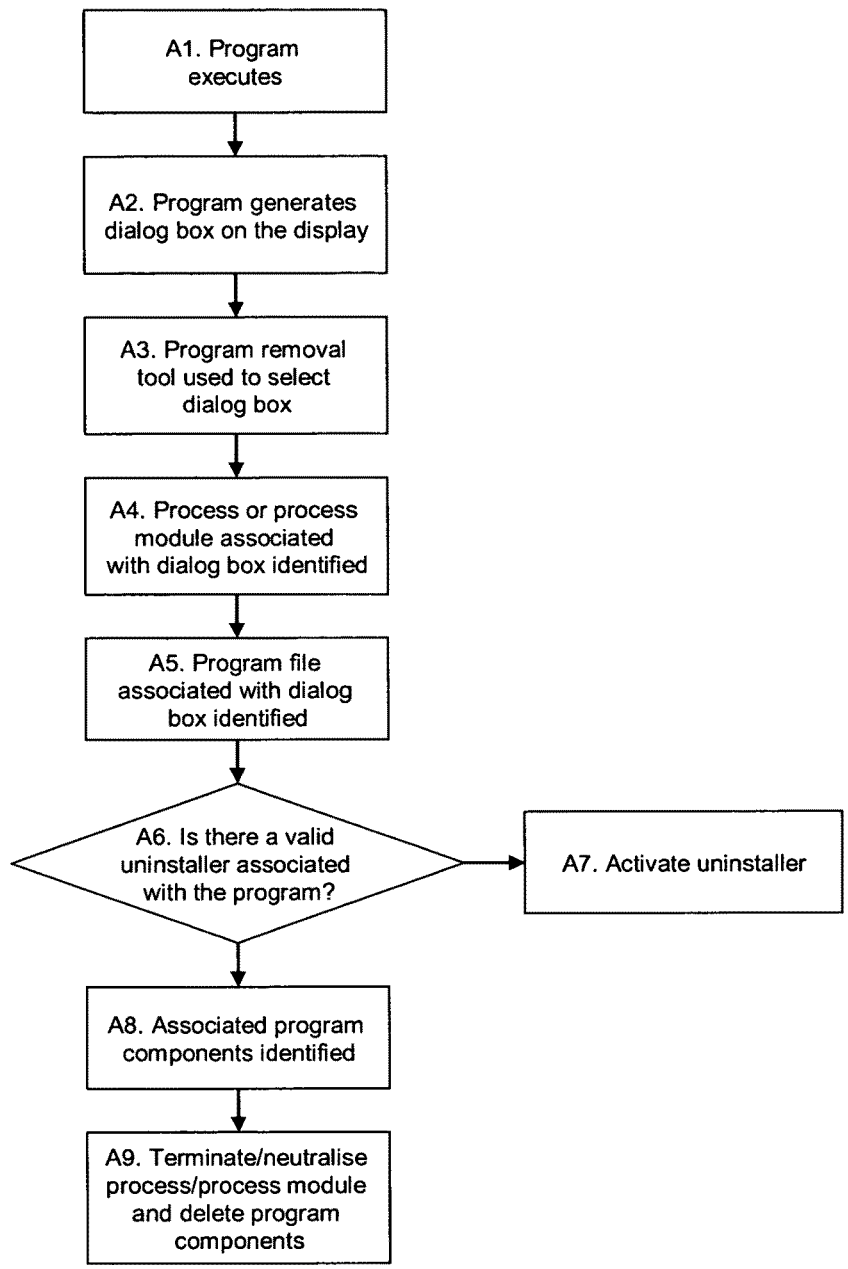
FIG. 2 is a flow diagram illustrating the process of removing a program from a computer system according to an embodiment of the present invention.

FIG. 2 is a flow diagram illustrating the process of removing malware from a computer. The steps are performed as follows:

A1. An unwanted program or application, such as some adware or scareware, is run/executed on the computer system 1.

A2. The display of the computer displays various graphics relating to the programs/executable files installed and/or running on the computer 1, including any dialog boxes generated by the unwanted program. For example, dialog boxes can include pop-up windows, message balloons, etc.

A3. The user of the computer 1 identifies one of the dialog boxes displayed on the display as relating to an unwanted program that they wish to remove. For example, the display is displaying a pop-up or dialog box that the user believes relates to some form of adware or scareware. The user therefore activates the program removal tool 6 and uses the display selection unit 7 to select the identified graphic. For example, the user could activate/run the program removal tool 6 by using a user input device, such as a keyboard or mouse, to select (e.g. by double clicking) an appropriate icon on the display. The display selection unit 7 would then prompt the user to select the dialog box using the user input device (i.e. by using a mouse to click on the pop-up or dialog box). As an alternative example, the user could use a user pointing device to initiate a drop-down menu, from which the user could then select the program removal tool 6 (i.e. by using the "right-click" function on a mouse whilst the cursor/pointer is located over the pop-up or dialog box).

A4. The selection of the identified dialog box activates the removal unit 8. The removal unit 8 then identifies any running processes, process modules and/or threads that are associated with the selected dialog box (i.e. that are responsible for generating the dialog box).

A5. The removal unit 8 then identifies the program/executable file responsible for the creation of the dialog box. Typically this would involve identifying the program/ executable file responsible for creating the identified process. In some exceptional cases, this may actually involve identifying a library that has been loaded into a host process. However, most programs, including scareware and adware programs, create their own processes.

A6. The removal unit 8 then determines if there is a valid uninstaller associated with the program/executable file.

A7. If the removal unit 8 identifies a valid uninstaller, it activates the installer to remove the program/executable file.

A8. If the removal unit 8 does not identify a valid uninstaller, it then identifies any other program components. For example, the removal unit 8 may identify any other files, located within the same folder within the memory of the computer system, that were installed at the same time as the identified program/executable file. This could be achieved by comparing the time stamps of the files. The removal unit 8 may also identify data and configuration files belonging to the program files, any directories that were created by the program, and identify any keys and values within the registry that belong to the program.

A9. The removal unit 8 terminates or disables any processes or any process modules identified as being associated with the dialog box. The removal unit 8 also deletes or disables the identified program components, including the program/executable file, and any other files, empty folders, directories, registry keys or values that have been identified as being associated with the program.

Figure 3:
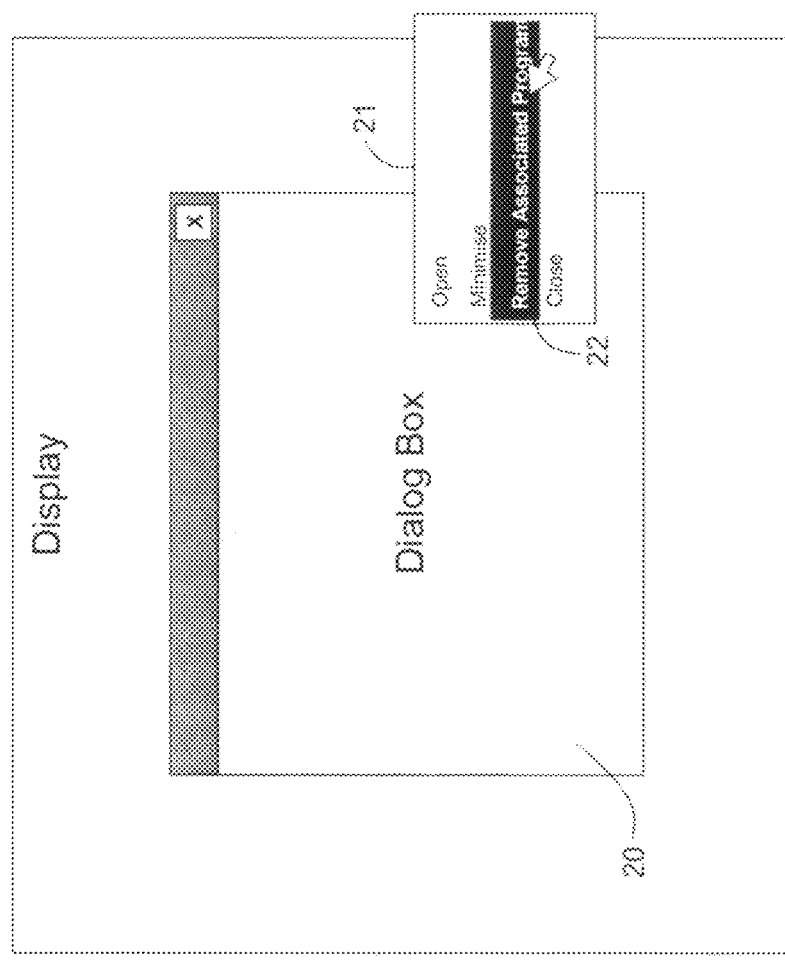
FIG. 3 is an example screen capture illustrating the initiation of the removal of a program from a computer system according to an embodiment of the present invention.

FIG. 3 is an example screen capture illustrating the initiation of the removal of some malware from a computer system. The dialog box 20 has been generated by some scareware, and is displaying a message regarding some hoax malware infections in an attempt to scare the user into purchasing and/or downloading some software. The user has recognised this as an indication of a possible malware infection and has therefore decided to remove the malware using the program removal tool 6. The user has therefore selected the dialog box 20 using a user pointing device to point-and-click on the dialog box. The point-and-click action involves moving the user pointing device to position a pointer or cursor over the dialog box 20, and pressing a button on the user pointing device. In this example, this point-and-click action has initiated a drop-down menu 21. The user has then selected the "Remove Associated Program" option 22 from the drop-down menu 21 in order to activate the program removal tool 6.

This can be achieved by registering a message handler to be notified when the user activates the "Remove Associated Program" option from the drop-down menu by pressing down on a button on the user pointing device. A handle for the dialog box is then obtained (i.e. using the WindowFromPoint( ) function of Microsoft® Windows®), from which the thread and process that created the dialog box can be identified (i.e. using the GetWindowThreadProcessId( ) function). The program/executable file can also be identified from the handle for the dialog box (i.e. using the GetWindowModuleFileName function).

When attempting to remove a program the program removal tool 6 can provide a user with an indication of the changes that are going to be made (i.e. it can display to the user the processes that are to be terminated and the components that are to be deleted), and can request input from the user as to whether they wish to accept all, some or none of the proposed changes. In addition, the program removal tool 6 can also be provided with "undo" functionality, in which the removal unit 8 stores any changes that it makes (i.e. stores copies of any deleted files, folders, registry keys etc) in the storage unit 5. If the user then decides that they would like to reinstate the program, for example, if the removal of the program has lead to some undesirable side-effects, then the program removal tool 6 can undo/reverse the changes.

Following the removal of a program from the computer 1, the program removal tool 6 can send details of the removal to the central anti-virus server 10 using the transceiver 4. The central anti-virus server 10 can store these details in the database 12. The analysis unit 16 can then analyse the removal data in the database 12 to determine if the program relates to some previously unknown malware, or to determine if a removed program is legitimate. If a removed program is identified as malware then the analysis unit 16 can update the malware definition data provided to anti-virus programs. Alternatively, if a removed program is determined to be legitimate, the analysis unit 16 can send a notification to any computers from which the program has been removed. These computers can then notify the user, and prompt the user to undo/reverse the changes and therefore reinstall the program, if they so desire.

The program removal tool 6 could also be used to remove a program by selection of a file, folder, desktop shortcut, registry key or process associated with the program from within a window or list displayed on the display.

The approaches described above provide that users of a computer device can identify and remove suspected malware that displays a dialog box on the display of the computer, such as adware or scareware. In addition, these approaches provide a mechanism for uninstalling programs that is straightforward for users to implement.

It will be appreciated by the person of skill in the art that various modifications may be made to the above described embodiments without departing from the scope of the present invention. For example, whilst the embodiments above have been specifically described with regards to the removal of malware, the invention can equally be used to remove/uninstall other programs/applications that the user wishes to remove.

The invention claimed is:

1. A method for implementation on a computer system in order to remove or disable a malicious program that creates dialog boxes on a display of the computer system, the method comprising:
  displaying one or more dialog boxes on the display of the computer system;
  activating a malicious program removal tool and accepting user input to the tool from a user input device that identifies the dialog box displayed on the display of the computer system, wherein the input from the user input device comprises a point-and-click input from a user pointing device that has been used to position a pointer over the dialog box on the display;
  identifying a process or process module and program components that created the identified dialog box; and
  attempting to terminate or disable the identified process or process module, and remove or disable the identified program components.

2. The method as claimed in claim 1, wherein program removal is implemented by a program removal application that is initiated prior to the identification of the dialog box displayed on the display.

3. The method as claimed in claim 1, wherein program removal is implemented by a program removal application that is initiated by the identification of the dialog box displayed on the display.

4. The method as claimed in claim 1, wherein the program components comprise any of:
  one or more program files;
  one or more folders for containing the program files;
  one or more data an configuration files belonging to the program files; and
  one or more registry keys and values.

5. The method as claimed in claim 4, wherein the step of identifying the process or process module and program components that created the identified dialog box; further comprises:
  identifying the process or process module that created the dialog box;
  identifying the program file that created the dialog box; and
  identifying any other files, registry keys and values associated with program file.

6. The method as claimed in claim 5, wherein the step of attempting to remove the identified program components further comprises:
  attempting to delete any identified program file; and
  attempting to delete any other files, registry keys and values identified as associated with program file.

7. A computer program comprising computer program code means adapted to perform the following steps:
  display one or more dialog boxes on a display of a computer system;
  activate a malicious program removal tool and accept user input to the tool from a user input device that identifies the dialog box displayed on the display of the computer system, wherein the input from the user input device comprises a point-and-click input from a user pointing device that has been used to position a pointer over the dialog box on the display;
  identify a process or process module and program components that created the identified dialog box; and
  attempt to terminate or disable the identified process or process module, and remove or disable the identified program components.

8. The computer program as claimed in claim 7 embodied on a non-transitory computer readable medium.

9. A computer system configured to remove or disable a malicious program that creates dialog boxes on a display of the computer system, the computer system comprising:
  a program removal unit for displaying one or more dialog boxes on the display of the computer system, activating a malicious program removal tool and accepting user input to the tool from a user input device, the input comprising identification of the dialog box displayed on the display of the computer system, wherein the input from the user input device comprises a point-and-click input from a user pointing device that has been used to position a pointer over the dialog box on the display, identifying a process or process module and program components that created the identified dialog box, and attempting to terminate or disable the identified process or process module, and remove the identified program components.

* * * * *